Sept. 25, 1962     D. S. MUTTI     3,055,138
TROLLING SPOON
Filed Nov. 25, 1959
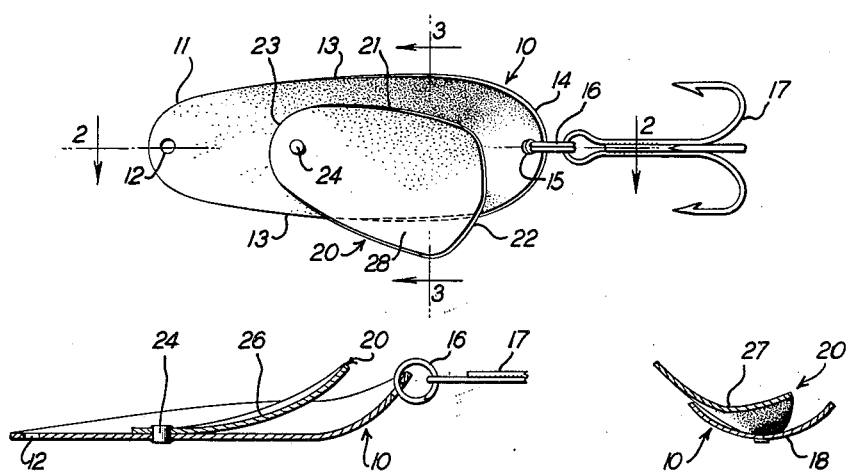
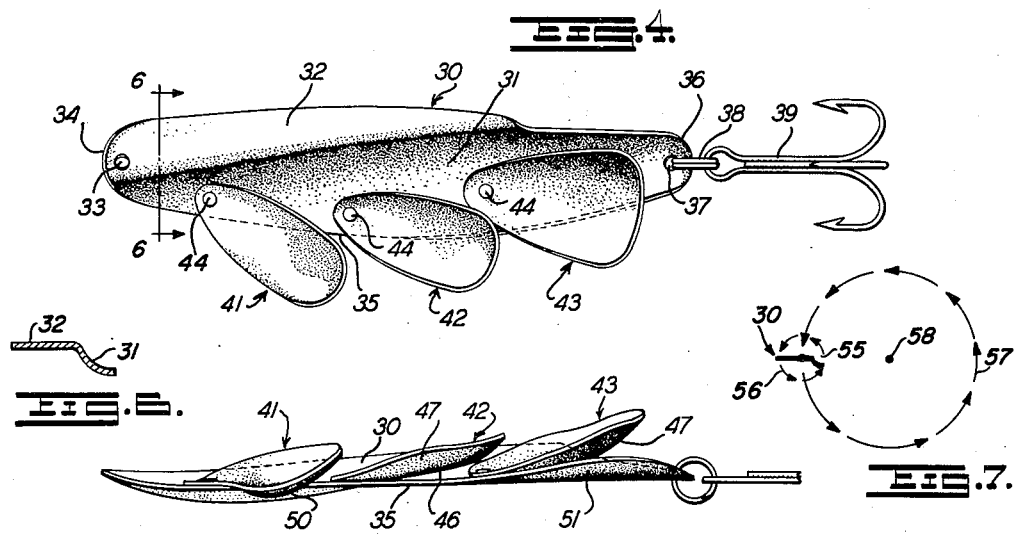
INVENTOR
DANIEL S. MUTTI
BY *John F. Phillips*
ATTORNEY

3,055,138
TROLLING SPOON
Daniel S. Mutti, Rte. 1, Box 13, McGregor, Minn.
Filed Nov. 25, 1959, Ser. No. 855,326
4 Claims. (Cl. 43—42.13)

This invention relates to a trolling spoon.

I am aware that many trolling spoons have been developed which are made attractive to fish because of the motion of the spoon in the water. Spoons of this type sometimes are caused to rotate on their own axes. I am also aware that some of these devices are caused to bodily orbit spirally around axes offset from the axes of the spoons as they move forwardly.

An important object of the present invention is to provide a novel type of spoon which performs the two motions referred to above, namely rotation on its own axis and bodily orbital spiral movement about an axis offset from the axis of the spoon as the spoon is pulled through the water.

A further object is to provide such a device having a body portion and a wing or blade so connected thereto as to be movable to adjust the speed of rotation of the device on its own axis and the extent of bodily orbital movement of the device around an offset axis.

A further object is to provide a device of this character wherein the wing or blade is attached to the body of the device by some frictional holding means such as a rivet, whereby the blade may be swung to adjusted angles to determine particularly the extent of bodily orbital movement of the device around an offset axis.

A further object is to provide a device of this character wherein the wing or blade extends laterally in most adjusted positions beyond the edge of the body so as to form a protrusion which attracts the fish while the device is moving through the water.

A further object is to provide a lure of the character referred to which is supplied with a plurality of the wings or blades, each one of which is adjustable to provide, if desired, varying tendencies of such blades to cause bodily spiral orbital movement of the device bodily around an offset axis, which results in an uneven bodily orbital movement which has been found very attractive to the fish.

Other objects and advantages of the invention will become apparent during the course of the following description.

In the drawing I have shown one embodiment of the invention. In this showing:

FIGURE 1 is a plan view of one form of the device;

FIGURE 2 is a section along line 2—2 of FIGURE 1;

FIGURE 3 is a transverse section on line 3—3 of FIGURE 1;

FIGURE 4 is a plan view of a modified form of the device;

FIGURE 5 is an edge elevation of the same;

FIGURE 6 is a detail sectional view on line 6—6 of FIGURE 4; and

FIGURE 7 is a diagrammatic view illustrating the rotational and spiral movements of the trolling spoon.

Referring to FIGURES 1, 2 and 3, the numeral 10 designates the body of the device, preferably formed as a stamping from any suitable sheet material. The body 10 has a forward substantially semicircular end 11 in which is formed an opening 12 for connecting the body to the usual line, the conventional swivel (not shown) being arranged adjacent the body of the lure. The body 10 preferably has its longitudinal edges tapered as at 13 to increase in width toward the rear end of the device, such end also being substantially semicircular as at 14. The rear end of the device is apertured as at 15 for connection with a ring 16 to which is attached a conventional hook structure 17. The body of the device is curved transversely from edge to edge as at 18 (FIGURE 3).

A wing or blade 20 is connected to the body 10. This wing also tapers to increase in width rearwardly as at 21, and the rear end of the blade 20 is rather bluntly curved from side to side as at 22. The forward end of the blade 20 may be semicircular as at 23 and adjacent such end, the blade 20 is connected to the body as at 24, preferably by riveting it in position. The rivet 24 is arranged centrally of the width of the body 10 in longitudinal alinement with the apertures 12 and 15.

Referring to FIGURE 2, it will be noted that the blade 20 curves longitudinally as at 26 so that its face remote from the body 10 is concave. The blade 20 is also curved transversely as at 27. The rivet 24 serves as means for frictionally holding the lower face of the forward end of the blade 20 in engagement with the adjacent face of the body 10 while permitting manual force to be applied edgewise to the rear portion of the blade 20 to change the angle between its longitudinal center and the longitudinal center of the body 10.

In FIGURES 4 and 5 a modified form of the device is shown. Such modification comprises a body indicated as a whole by the numeral 30, part of which is curved transversely as at 31 while, at one side thereof, the body extends relatively flat for a substantial portion of the length of the body 30, as at 32 (FIGURE 6). Such portion of the body is provided in its forward end with a line-connecting aperture 33, and the forward end of the body 30 is substantially semicircular as at 34. The body portion 32 tends to resist axial spinning movement of the device in the water to prevent the rotational speed of the body from being too great, as referred to below.

The edge of the body portion 31 is curved from end to end as at 35 and the body terminates in a substantially semicircular rear end 36, projecting rearwardly a considerable distance beyond the body portion or wing 32. The rear end of the body 30 is provided with an aperture 37 for connection with the usual ring 38 to which the hook structure 39 is connected.

A plurality of wings or blades 41, 42 and 43 are connected to the body portion 31 by rivets 44 which perform the same function as the rivet 24 previously described, namely, of holding the blades 41, 42 and 43 in any adjusted position. Each of the blades just referred to is curved longitudinally from end to end as at 46, and each blade is further curved from side to side as at 47, thus providing a dished construction as is true of the blade 20 previously described. The blades 41 and 42 are connected to relatively flat portions of the body 30, and such portions slope downwardly slightly toward the observer in FIGURE 5. This is particularly true of the portion of the body to which the blade 41 is connected, hence this body tends to hang downwardly a little below the edge 35 of the body 30, as indicated at 50. Actually, the blades 41 and 42 are substantially identical, while the blade 43 is somewhat wider and it is adapted to have its angular position limited by being moved into abutting relationship with an upturned lip portion 51 formed at the lower edge of the body portion 31 as viewed in FIGURE 4. Such lip portion is clearly shown in FIGURE 5.

As further described below, the lure, in moving forwardly through the water, partakes of two movements, one of which is rotational about its own axis and the other of which is bodily spiral orbital movement about another axis to be referred to. FIGURE 7 diagrammatically illustrates these two movements and the spoon therein diagrammatically shown corresponds generally to the spoon in FIGURES 4 and 5 and has been indicated as a whole by the numeral 30 representing the body of the spoon referred to. It will become apparent that the same movements will take place in the use of both forms of the invention. The axis of the body of the spoon may be considered to be a line connecting the openings 33 and 37 and such line, looking endwise of the device, is indicated in FIGURE 7 by the numeral 55. The action of the wings or blades attached to the bodies of the device is such that either spoon is adapted to rotate about such axis as indicated by the arrows 56. While partaking of such axial rotation the spoon partakes of a spiral orbital bodily movement which will appear as a circle in FIGURE 7 and is indicated by the series of arrows 57, such circle having its center at the point 58 offset from the axis 58 of the spoon.

*Operation*

In the form of the invention shown in FIGURE 1, the blade 20 may be swung inwardly at its rear end into longitudinal alinement with the center of the body 10, in which case there will be little tendency for the spoon to rotate and it will tend to wobble somewhat going through the water. By turning the blade 20 slightly outwardly at an angle, the rear end portion of the blade 20 will have an angular portion relative to the body 10 so that when the device is pulled through the water, there will be a rotary action of the spoon around its own axis, that is, about a line connecting the centers of the openings 12 and 15. In each form of the invention there is a protuberance of one or more blades laterally beyond one longitudinal edge of the body portion, the other edge of each body portion being smooth and free from protuberances of any kind, thus causing resistance to forward movement of the spoon at one longitudinal edge of the body thereof greater than at the other edge. In the case of the form of the device shown in FIGURES 1, 2 and 3 the laterally offset portion of the upturned rear end of the body 20 also causes the device as a whole, as it rotates on its own axis, to bodily orbit around the center line indicated by the numeral 58 in FIGURE 7, the bodily movement of the spoon as it moves forwardly through the water obviously being spiral in form. The greater the angularity of the blade 20, the more rapid will be the rotation of the device on its own axis and the greater will be the extent of orbital bodily spiral movement in the manner referred to. The blade 20 may be set at various angles to predetermine the action of the device in the water, and the lure has been found, because of such varied motions, to be highly attractive to fish, some of which are attracted by smaller orbital bodily spiral movements about the axis 58 and others of which are attracted by orbital bodily spiral movement to a greater extent around the axis 58.

Substantially the same results are obtainable with the device shown in FIGURES 4 and 5. With the angular relationship of three blades 41, 42 and 43, there may be a tendency for the device to rotate at too high a speed about its own axis, hence the provision of the fin portion 32 which tends to prevent such rotation and thus slows it down to a reasonable speed. With the blades 41, 42 and 43 arranged at different angles, each tends to function in the same manner as the blade 20 in FIGURE 1, with one blade tending to overcome the tendency of another blade to determine the speed of axial rotation, thus causing an uneven and very attractive motion of the device through the water. The overhanging or angular arrangements of the blades in FIGURES 4 and 5 also causes the device to partake of orbital bodily spiral movement about the axis 58, and the extent of such bodily spiral movement is determined by the angularity of the blades.

In FIGURE 1 the projection of a portion of the blade 20 beyond the adjacent portion of the edge 13 of the body, as the device rotates in the manner described, is attractive to fish. This projecting portion flashes around as rotation takes place, and the same is true of the blades 41, 42 and 43 shown in FIGURES 4 and 5. It has been found in practice that both forms of the device are highly attractive to fish of various types.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A trolling spoon comprising an elongated unitary body formed of sheet material having means at one end for connecting it to a line and means at the other end for connecting it to a hook, said body being concave in one face longitudinally at least adjacent said last-named end thereof, and a blade overlying said body and having its end corresponding to said first-named end of said body frictionally pivotally connected to said body whereby the other end of said blade is movable generally laterally relative to the length of said body, to project beyond one longitudinal edge of said body, the other longitudinal edge of said body being smooth and free of any lateral protuberance, said blade in one face being smoothly concaved longitudinally with the other face thereof lying against said one face of said body whereby, when said blade assumes an angle relative to said body, the concavity of said blade will be at an acute angle to the longitudinal center of said body to cause the spoon, when drawn through the water, to rotate on an axis represented by the center line of said body and to orbit spirally around an axis offset from the first-named axis.

2. A trolling spoon comprising an elongated unitary body formed of sheet material having means at one end for connecting it to a line and means at the other end for connecting it to a hook, said body being concave in one face longitudinally at least adjacent said last-named end thereof, and a blade overlying said body and having its end corresponding to said first-named end of said body frictionally pivotally connected to said body whereby the other end of said blade is movable generally laterally relative to the length of said body to project beyond one longitudinal edge of said body, the other longitudinal edge of said body being smooth and free of any lateral protuberance, said blade in one face being smoothly concaved longitudinally with the other face thereof lying aaginst said one face of said body whereby, when said blade assumes an angle relative to said body, the concavity of said blade will be at an acute angle to the longitudinal center of said body to cause the spoon, when drawn through the water, to rotate on an axis represented by the center line of said body and to orbit spirally around an axis offset from the first-named axis, said body and said blade being transversely concaved in said longitudinally concave faces thereof.

3. A trolling spoon comprising an elongated unitary body formed of sheet material having means at one end for connecting it to a line and means at the other end for connecting it to a hook, said body being concave in one face longitudinally at least adjacent said last-named end thereof, and a blade overlying said body and having its end corresponding to said first-named end of said body frictionally pivotally connected to said body whereby the other end of said blade is movable generally laterally relative to the length of said body, said blade in one face being smoothly concaved longitudinally whereby, when said blade assumes an angle relative to said body, the concavity of said blade will be at an acute angle to the longitudinal center of said body to cause the spoon, when drawn through the water, to rotate on an axis represented by the center line of said body and to orbit spirally around an axis offset from the first-named axis, the width of said other end of said blade being such that when said blade is arranged with its longitudinal center line at an angle to the longitudinal center line of said body, an edge portion of said blade adjacent said other end thereof will project laterally beyond the adjacent longitudinal edge portion of said body said edge portion of said blade being smooth and the other longitudinal edge portion of said body being smooth and free of any lateral protuberance.

4. A trolling spoon comprising an elongated body of sheet material having means at one end for connecting it to a line and means at the other end for connecting it to a hook, and a plurality of blades arranged progressively along said body from end to end thereof and each having its end toward said first-named end of said body frictionally pivotally connected thereto whereby each blade is adapted to have its other end swung toward and away from the center line of said body to angle the longitudinal center lines of said blades relative to the longitudinal center line of said body with the other ends of said blades projecting laterally beyond one longitudinal edge of said body, the other longitudinal edge of said body being smooth and free of any lateral protuberance, said blades being concave transversely in corresponding faces thereof, the pivotal connections of said blades lying to one side of the longitudinal center of said body, said body having portions to said one side of said longitudinal center thereof concaved transversely, said body having an edged portion to the other side of the longitudinal center thereof formed flat to form a brake to limit rotational speed of the spoon about the longitudinal center of said body.

References Cited in the file of this patent

UNITED STATES PATENTS

| | | |
|---|---|---|
| 1,036,380 | Tileston | Aug. 20, 1912 |
| 1,977,003 | Maynard | Oct. 16, 1934 |
| 2,123,150 | Larson | July 5, 1938 |
| 2,185,771 | Mann | Jan. 2, 1940 |
| 2,706,868 | Le Blanc | Apr. 26, 1955 |
| 2,906,053 | Eales | Sept. 29, 1959 |
| 2,907,131 | Bugge | Oct. 6, 1959 |